Figure 1:
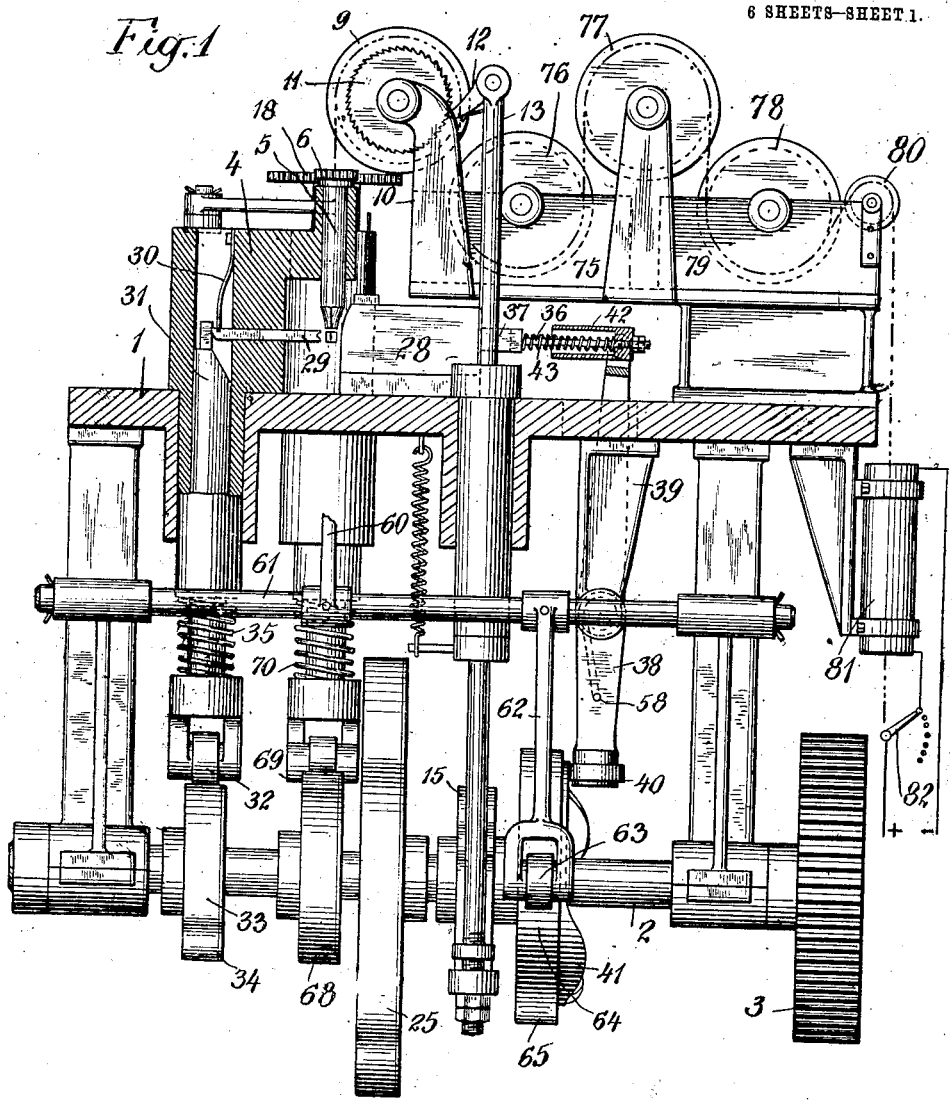

A. C. PRATT.
CHAIN MAKING MACHINE.
APPLICATION FILED MAY 12, 1911.

1,033,466.

Patented July 23, 1912.
6 SHEETS—SHEET 1.

WITNESSES:

INVENTOR
A. C. Pratt
BY
Edmonds & Edmonds
ATTORNEYS

A. C. PRATT.
CHAIN MAKING MACHINE.
APPLICATION FILED MAY 12, 1911.

1,033,466.

Patented July 23, 1912.
6 SHEETS—SHEET 2.

WITNESSES:

INVENTOR
A. C. Pratt
BY
Edmunds & Edmunds
ATTORNEYS

A. C. PRATT.
CHAIN MAKING MACHINE.
APPLICATION FILED MAY 12, 1911.
1,033,466.
Patented July 23, 1912.
6 SHEETS—SHEET 3.
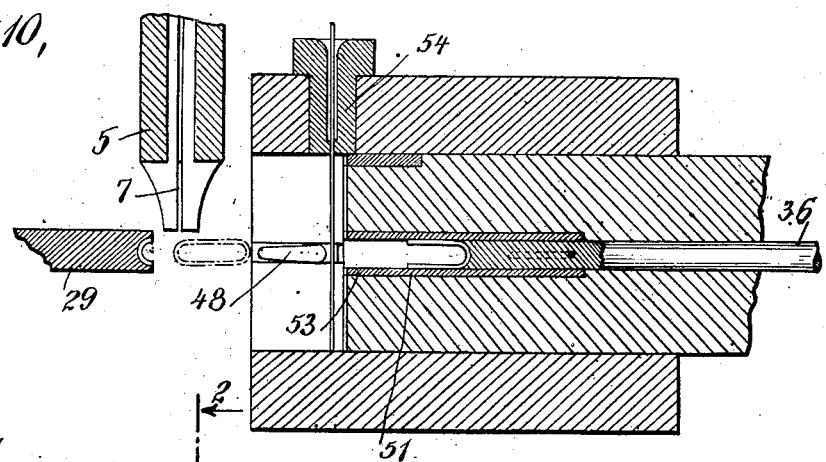
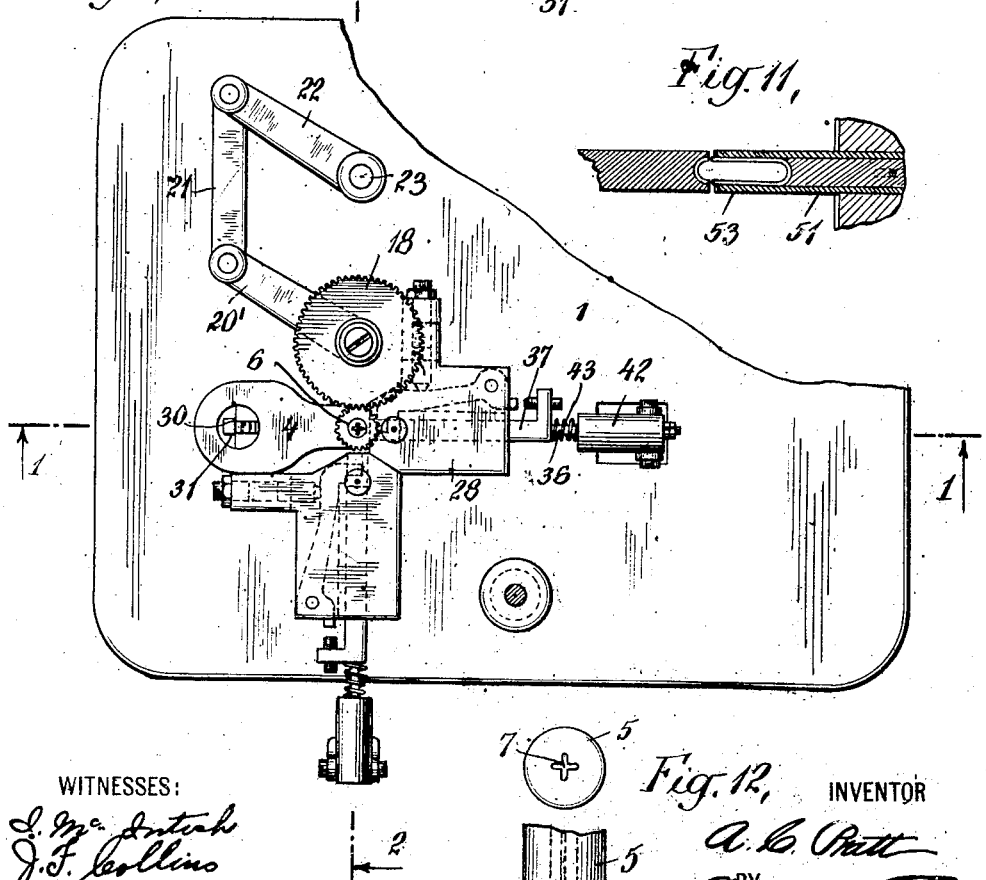
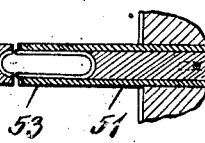

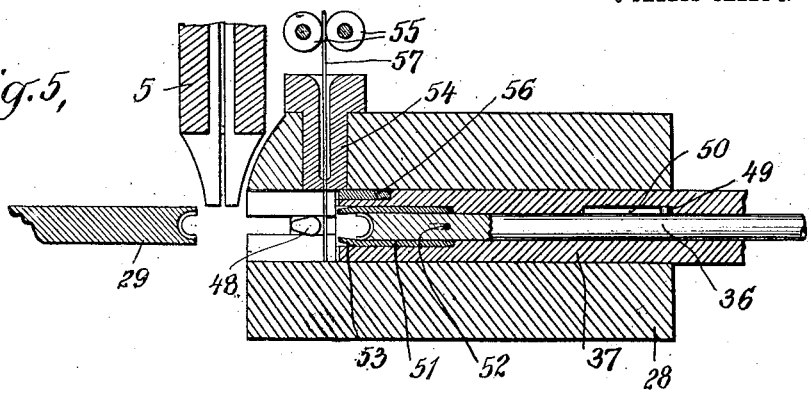
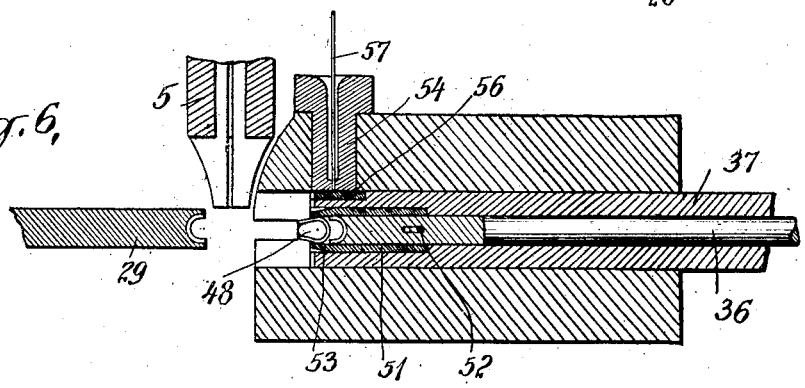
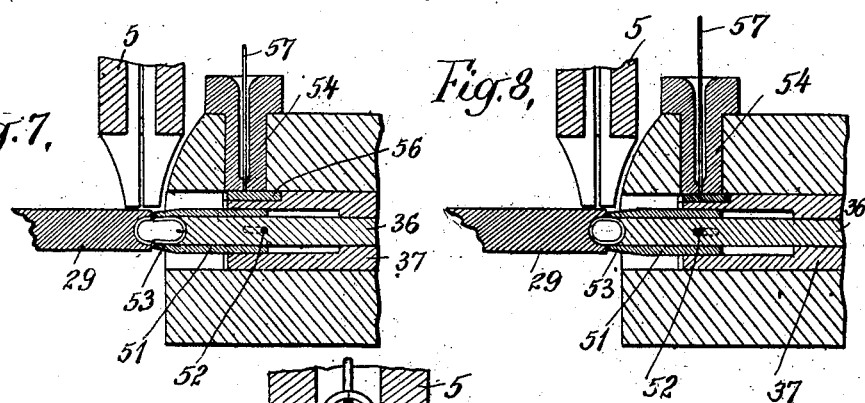
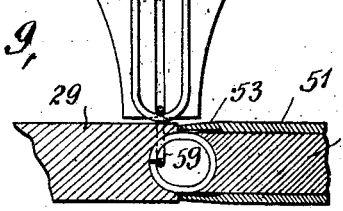

A. C. PRATT.
CHAIN MAKING MACHINE.
APPLICATION FILED MAY 12, 1911.

1,033,466.

Patented July 23, 1912.
6 SHEETS—SHEET 5.

WITNESSES:

INVENTOR
A. C. Pratt
BY
ATTORNEY

A. C. PRATT.
CHAIN MAKING MACHINE.
APPLICATION FILED MAY 12, 1911.

1,033,466.

Patented July 23, 1912.
6 SHEETS—SHEET 6.

WITNESSES:

INVENTOR
A. C. Pratt
BY
Edmonds & Edmonds
ATTORNEY

UNITED STATES PATENT OFFICE.

ALPHONSO C. PRATT, OF MONTCLAIR, NEW JERSEY.

CHAIN-MAKING MACHINE.

1,033,466.  Specification of Letters Patent.  Patented July 23, 1912.

Application filed May 12, 1911. Serial No. 626,637.

*To all whom it may concern:*

Be it known that I, ALPHONSO C. PRATT, a citizen of the United States, residing at Montclair, in the county of Essex, State of New Jersey, have invented certain new and useful Improvements in Chain-Making Machines, of which the following is a specification.

This invention relates to machines for making chain automatically by making links successively and meshing each link with the links previously made.

The object of the invention is to construct a machine of this type which is capable of reliable operation in making chain automatically.

The invention involves the provision of means for making chain having similar links throughout, or chain wherein the form of the links is varied at uniform intervals throughout the length of the chain.

In accordance with the invention one or more pairs of forming-tools are provided each of which may be operated to form a link at each operation, and in combination therewith a support is provided for holding the length of chain already made in a definite relation so that during the operation of making a link that link may be meshed with the end link of the chain. Means are provided for moving the chain relatively to its support so that at each operation of the forming-tools the link made in the next preceding operation will be held in the relation required for meshing a link therewith. Furthermore, the support for the chain may be moved so that the chain held thereby may be moved bodily about its axis in order to present the end link of the chain to the forming-tools as may be required in making the form of chain desired. In combination with these devices, apparatus is preferably employed whereby the ends of each link of the chain are joined together. These and other features of the invention will be fully described hereinafter and definitely pointed out in the claims appended hereto.

The accompanying drawings illustrate an embodiment of the invention.

Figure 2:
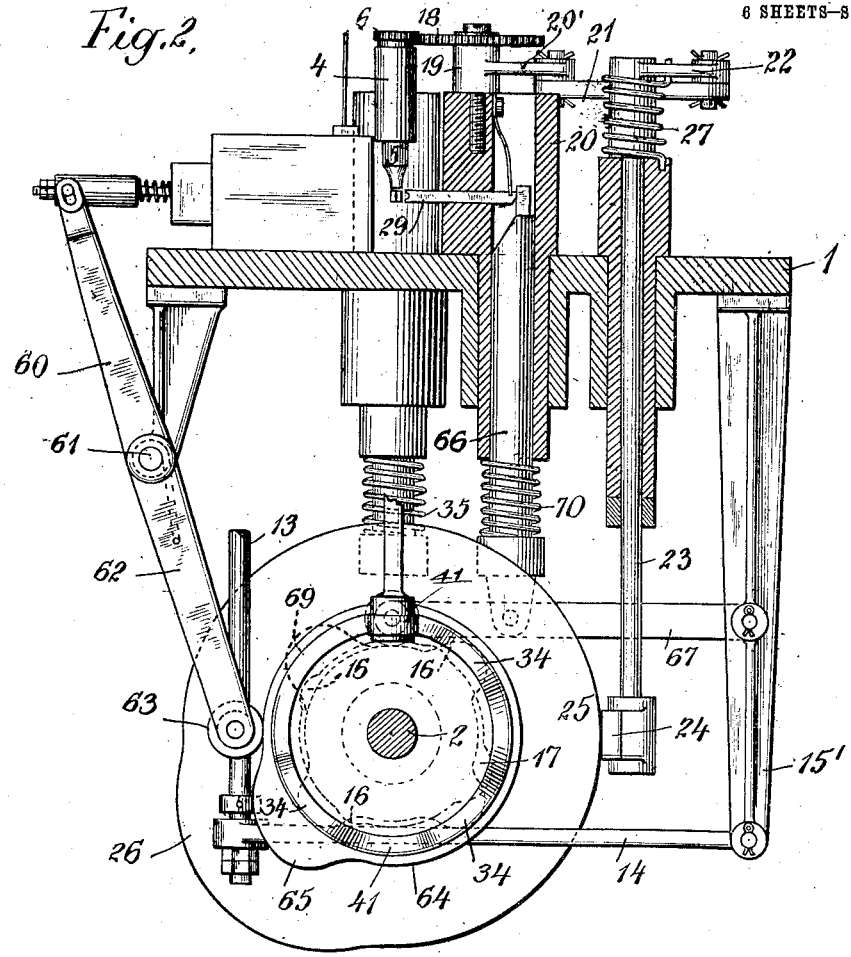
Figure 3:
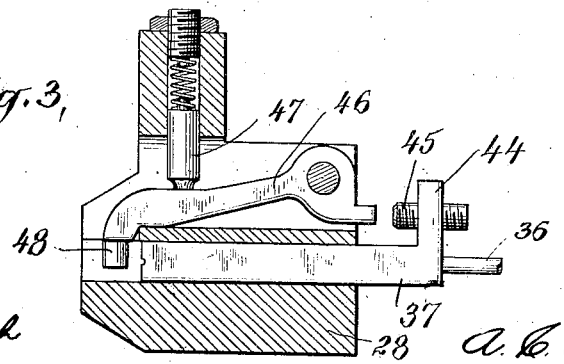
Figure 13:
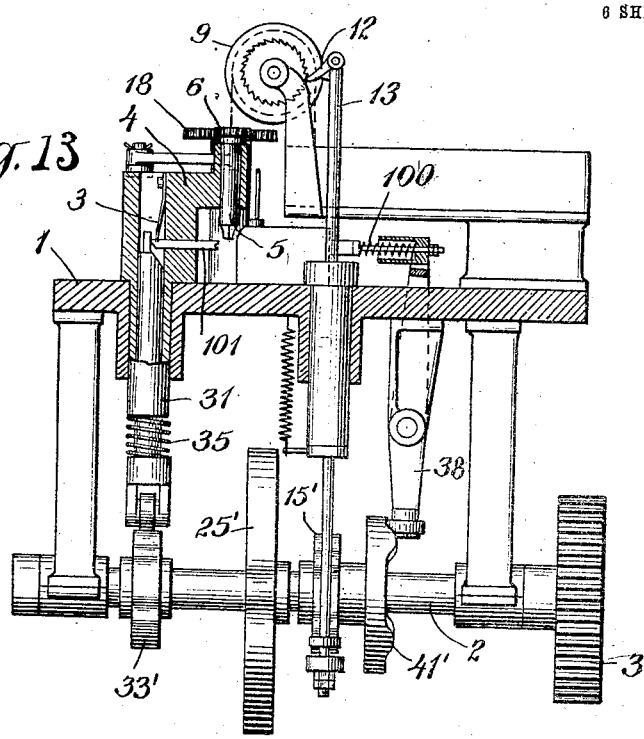
Figure 14:
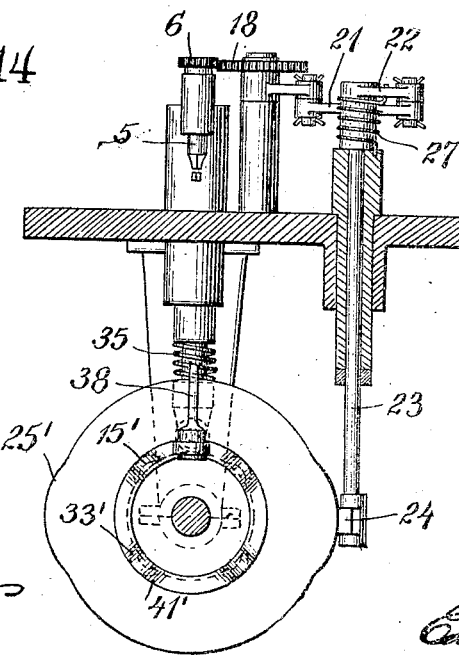
Figure 15:
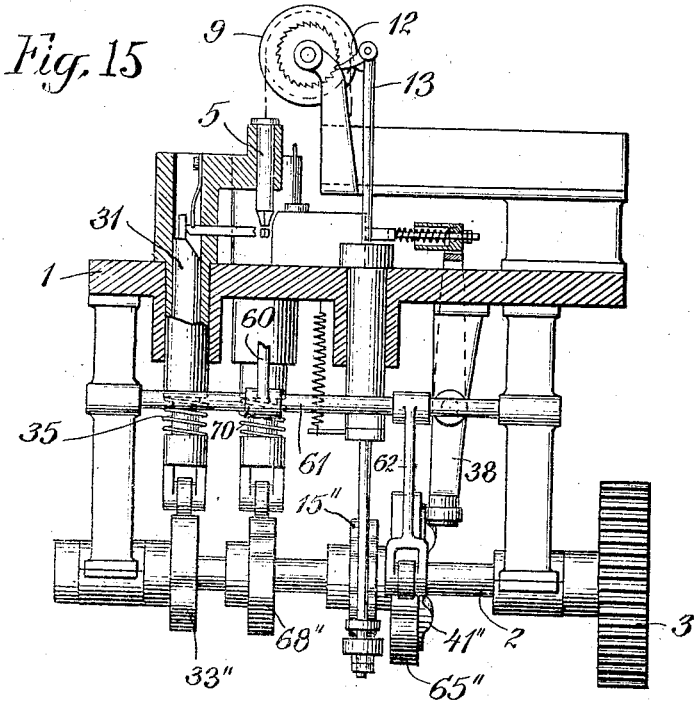
Figure 16:
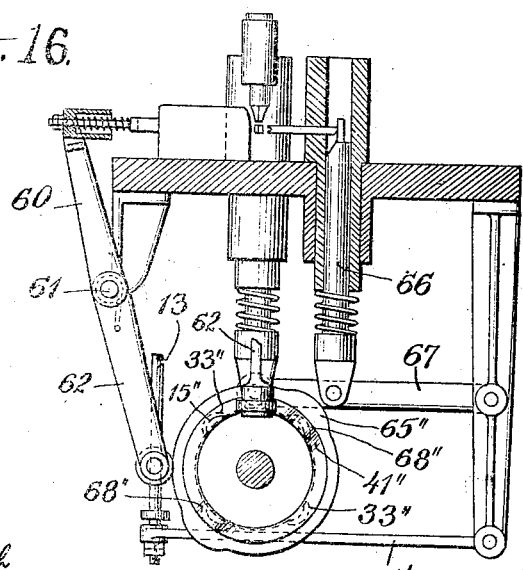

In these drawings Figure 1 is a sectional view of the machine on the line 1—1 of Fig. 4, Fig. 2 is a section of the machine on line 2—2 of Fig. 4, Fig. 3 is a sectional detail view hereinafter described, Fig. 4 is a top view of the machine, some of the parts being removed, Figs. 5 to 9 inclusive are detail views showing various positions of one set of the forming-tools, Figs. 10 and 11 are views corresponding to Figs. 5 and 7 respectively and showing the other set of forming-tools, Fig. 12 is a view of the holder for the chain, Figs. 13 and 14 are views corresponding to Figs. 1 and 2 but illustrating a modification, and Figs. 15 and 16 are views corresponding to Figs. 1 and 2 illustrating a further modification.

Referring to these drawings, 1 indicates a table upon which the various parts of the machine are mounted and below this is a power-shaft 2 mounted for rotation in suitable bearings and provided with driving mechanism such as a pulley or gear 3. Mounted on the table 1 is a block 4 in which is a vertically disposed opening receiving the support 5 for the chain. This support is circular in cross-section so that it may turn about its axis in its opening in the block 4 and to its upper end is secured a pinion 6 whereby such rotational movement of the support may be effected. The construction of the support is shown in Fig. 12 from which it will be seen that the support has an opening 7 therethrough which is of cruciform cross-section. The lower end of the support 5 is tapered somewhat and this end is provided with two lengthwise slots 8 one at right angles to the other so as to form at the lower end of the support spring-fingers which will press inwardly with a light tension so as to hold the links of the chain at the lower end of the support firmly. The links of the chain are formed successively at the lower end of the support 5, each link being meshed with the end link of the chain which passes upwardly through the support 5, such end link at that time projecting below the lower end of the support 5 a sufficient distance to permit the new link to be meshed therewith. After each operation of forming a link the chain is moved upwardly through the support 5 a distance equal to the length of one link. Such movement of the chain is effected by a wheel 9 mounted for rotation upon a support 10 secured upon the table 1. The wheel 9 is provided with a ratchet wheel 11 with which co-acts a spring-actuated pawl 12 pivotally mounted upon the upper end of a rod 13 which passes downwardly through an opening in the table 1. At its lower end rod 13 is connected to one end of an arm 14 (Fig. 2) whose other end is pivotally mounted upon a support 15' depending from the table 1. This arm 14 rides upon the periphery of a cam 15 secured upon the power-shaft 2.

The machine illustrated in the drawings is so constructed that four links are made during each revolution of the power-shaft 2, and cam 15 is therefore provided with four projections so that four movements of wheel 9, and therefore of the chain passing upwardly through support 5, will take place during each revolution of the shaft 2. The chain made on the machine consists of three similar links, then one link of greater length, then three similar links, and so on, so that the feeding movements of the chain passing upwardly through support 5 must consist of three steps of equal length, then one of greater length, then three of equal length and so on. Three of the raised portions on cam 15 are of equal height, as shown at 16 in Fig. 2, and the fourth one is of substantially greater height, as shown at 17. The raised portions 16 are such that they will operate through arm 14 and rod 13 to turn the wheel 9 a distance equal to one tooth of the ratchet 11 and the single tooth 17 is of such height that it will rotate wheel 9 a distance equal to three teeth of the ratchet 11.

In making chain of the character above described two sets of forming-tools are employed, one set for making links of one size and the other set for making the links of the other size, and these two sets of forming-tools are displaced one from the other 90 degrees. In the finished chain the links are displaced angularly one from the next adjacent one by 90 degrees. Therefore, it is necessary to turn the chain upon its axis during the operation of the machine so that the end link thereof will be properly presented to the forming-tools. In making such a chain as that above described the chain is held in one position for making a link, is then turned through 90 degrees for making the second link, is then turned back to the initial position for making the third link, these three links being made by the same set of forming-tools, and is then held in that position while the other set of forming-tools is making the fourth link. The chain will then be in the position for making the first of the next three similar links by the first set of forming-tools. It therefore appears that the chain must be turned through 90 degrees, held in that position while a link is being made, and then turned back to its initial position and held in that position while three links are being made, these three links being made by the two sets of forming-tools acting alternately. These movements of the chain are effected by moving the support 5 on its axis and this is accomplished by means of a gear 18 meshing with the pinion 6 secured to the support 5. Gear 18 is secured to the sleeve 19 which is mounted for rotation on a pin projecting upwardly from a block 20 secured upon the table 1. Sleeve 19 has an arm 20' (Fig. 4) projecting therefrom and the outer end of this arm is pivotally connected to one end of a link 21 whose other end is pivotally connected to an arm 22 secured upon the upper end of a rod 23 extending downwardly through an opening in the table 1. At its lower end rod 23 is provided with an arm 24 which rides upon the periphery of cam 25 secured upon the power-shaft 2. This cam is provided with a singular raised portion 26. Arm 24 is held in coaction with the periphery of cam 25 by a spring 27 coiled about rod 23 and having one end secured to arm 22 and the other end secured to the support for rod 23.

One of the sets of forming-tools is shown in Fig. 1 and the other is displaced angularly therefrom by 90 degrees as shown in Fig. 2. Referring to Fig. 1 the forming-tools of the set there shown are mounted in the block 4 and a block 28 mounted on the side of the support 5 opposite the block 4. In the block 4 is an opening in which a die 29 is adapted to reciprocate, this die being normally retracted by a spring 30. The die 29 is adapted to be moved forwardly by a cam surface formed in the upper end of a rod 31 which is adapted to slide vertically in an opening formed in the block 4. The lower end of this rod carries a roller 32 which rides on the periphery of a cam 33 secured upon shaft 2. This cam is provided with three raised portions 34 (Fig. 2) spaced apart 90 degrees. A spring 35 acts upon the rod 31 to hold the roller 32 always in contact with the periphery of cam 33. The other die member is formed upon the end of a rod 36 (Figs. 1 and 5) which is adapted to reciprocate within a plunger 37, the latter being adapted to reciprocate in an opening in the block 28. At its outer end the die-rod 36 is pivotally connected to the upper end of the lever 38 pivotally mounted upon a support 39 depending from table 1. Lever 38 has a roller 40 at its lower end adapted to ride upon the periphery of a cam 41 mounted upon the power-shaft 2. This cam has three raised portions spaced apart 90 degrees and positioned to correspond with the raised portions upon the cam 33. The connection between the lever 38 and the die-rod 36 is formed to provide a housing 42 for a spring 43 the end of which engages the adjacent end of the plunger 37 so as to move the plunger forward in its opening in block 28, until further movement of the plunger is arrested; thereafter die-rod 36 moves forward independently of plunger 37, the spring 43 being then compressed.

Referring to Fig. 3 it will be seen that the plunger 37 has a lateral projection 44 at its outer end in which is mounted a screw 45 adapted to engage one end of a bell-crank lever 46 pivotally mounted in a slot in block 28. This lever 46 is normally held in the position in which it is shown by a spring-actuated plunger 47. On the end of lever 46 is an anvil 48 normally projecting into the path of plunger 37 and die-rod 36. When plunger 37 moves forward in its opening in block 28, the end of screw 45 engages the end of lever 46 and rocks the lever on its pivot against the tension of the spring actuating the plunger 47 until the end of the anvil 48 is out of the path of rod 36, and as this occurs, the end of screw 45 engages the wall of block 28 on either side of the opening in the block for lever 46 and thus arrests further movement of the plunger 37. In the wall of the opening in the plunger 37 for the die-rod 36 is a lengthwise groove 50 adapted to receive a pin 49 upon the rod 36. (Fig. 5.) Near the other end of plunger 37 the opening therethrough is enlarged to provide a space in which is received a sleeve 51 on rod 36. This sleeve has a slot therein adapted to receive a pin 52 on the rod 36. The end of sleeve 51 normally extends beyond the end of rod 36 and is cut to provide prongs 53. These prongs extend toward each other a slight amount and the metal of sleeve 51 is such that the prongs have a spring action permitting their ends to be moved away from each other until they lie in line with the body portion of the sleeve. The ends of prongs 53 are grooved slightly and the end of plunger 37 is provided with a similar groove in line with the grooves in prongs 53 and directly opposite an opening through which the wire for the links is fed. This wire is fed in any suitable manner through a bushing 54 mounted in an opening in the block 28. Any suitable means may be provided for feeding the wire automatically, as for instance, feed rollers 55 shown diagrammatically in Fig. 5. The feeding movement is of a length equal to the width of the opening in the block 28 in which the plunger 37 reciprocates and the end of the plunger is provided with a hardened plate 56 which serves to cut off the strip of wire which has been fed into position.

Referring now to Figs. 5 to 9, the operation of the forming-tools will be described. Fig. 5 shows the position of the parts with the tools retracted and the wire 57 fed into position. The cam 41 on the power-shaft moves the die-rod 36 forwardly and the plunger 37 moves with it actuated by the spring 43. The length of wire 57 is immediately severed by plate 56 and is carried along by the plunger 37, the piece of wire lying in the groove formed in the end of the plunger and in the ends of prongs 53. Immediately thereafter the wire engages the anvil 48 and is bent around the same, the spring prongs 53 causing the wire to be shaped about the anvil. This operation of the parts is shown in Fig. 6. Immediately thereafter the anvil 48 is retracted by the mechanism above described in connection with Fig. 3 and the movement of plunger 37 is arrested. The movement of the die-rod 36 continues and sleeve 51 moves with the die-rod, these two parts carrying the partially formed link forward with them. At this time the die 29 is moved forward as above described, and the several parts come to the positions illustrated in Fig. 7. The ends of the partially formed link are thus moved into the groove in the end of the die 29. At this time the ends of prongs 53 engage the end of die 29, and during the further movement of rod 36, the sleeve slides upon the die rod a distance equal to the length of the slot in the sleeve through which the pin 52 extends. Rod 36 continues the forward movement until the ends of the link are brought together by the groove in the die 29, the parts being then in the position shown in Fig. 9. The backward movement of the rod 36 then takes place. During such backward movement the end of sleeve 51 engages the end of the depression in plunger 37 in which the sleeve lies, so that the sleeve is moved relatively to the die-rod 36 to its proper position as shown in Fig. 5. Also during this movement of rod 36 the stud 49 therein engages the end of the groove 50 in plunger 37 so that thereafter plunger 37 moves with rod 36 and in such movement permits restoration of the anvil 48. This backward movement of the die-rod is effected by a spring 58 which holds the roller 40 always in engagement with the cam 41.

It will be seen, particularly by reference to Fig. 9, that the two die members come together directly under the lower end of the support 5 through which a link of the chain is projecting, as shown at 59. The partially formed link which is moved forward from the Fig. 6 to the Fig. 7 position is in the form of a staple and the link 59 is held in such position that the upper leg of this staple is moved through the link 59 so that when the two ends of the staple are brought together by the die 29 to form a link, this link will be meshed with the link 59. Immediately after the forming-tools are retracted the feeding movement of the chain takes place such that the newly formed link will be raised to the level of the link 59

(Fig. 9); such newly formed link will, however, be disposed at a right angle to the link 59 and will therefore pass into the portion of the cruciform opening in support 5 other than the portion in which the link 59 lies.

The other set of forming-tools is constructed like the set above described except that the proportions of the parts are changed to such extent as is necessary to form the differently proportioned links. This set of forming-tools is illustrated in Figs. 10 and 11. It will be seen that the prongs 53 on the sleeve 51 are of substantially greater length and that the anvil 48 is also considerably elongated. The die-rod of this set of forming-tools is actuated by an arm 60 (Fig. 1) secured upon a rock-shaft 61 rotatable in bearings depending from the table 1. This rock-shaft has an arm 62 secured thereto carrying a roller 63 which rides upon the periphery of a cam 64 secured upon the power-shaft 2 and preferably formed integral with the cam 41. This cam 64 has a single projection 65 and this projection is so positioned that it and the three cam projections 41 are spaced apart 90 degrees. The die 29 of this set of forming-tools is operated in the manner above described by a rod 66 movable vertically in an opening in the block 20, its lower end being pivotally connected to an arm 67 which is pivotally mounted upon the support 15'. The free end of arm 67 coacts with a cam 68 secured upon the power-shaft 2, this cam having a single projection 69 which acts upon the arm 67 at the same time that the projection 65 acts upon the arm 62. A spring 70 acts upon the rod to hold the arm 67 always in contact with the cam 68.

The operation of the machine as thus constructed is as follows: A length of chain is inserted in the cruciform opening in the support 5 with its end link projecting beyond the lower end of the support. The machine is then started and the die-members of the set shown in Fig. 1 are operated by the cams 41 and 33 to form a link in the manner above described and mesh that link with the link projecting from the end of the holder 5. Immediately after the retraction of the forming-tools, the cam 15 operates wheel 9 to move the length of chain upwardly through holder 5 a distance equal to the length of the link just formed. The new link passes into the cruciform opening in the holder 5 so that it is held at a right angle to the link with which it is meshed. At the same time the holder 5 and with it the length of chain passing therethrough are turned through 90 degrees by the cam 25. The cams 41 and 33 then operate to form another link, after which the forming-tools are retracted and the chain is fed upwardly through the holder 51. During this feeding movement of the chain, the arm 24 rides off the projection 26 on cam 25 so that the holder 5 is turned backwardly through 90 degrees to its initial position. Cams 41 and 33 then operate the forming-tools to add another link to the chain after which the chain is fed upwardly as before. Thus three similar links have been added to the chain during three-quarters of a revolution of the shaft 2. During the remaining one-quarter of a revolution, the forming-tools of the set shown in Fig. 1 remain idle and the cams 64 and 68 operate the other set of forming-tools to form a link of different dimensions and add that link to the chain. After the operation of the forming-tools of the second set, the raised portion 17 on the cam 15 actuates the roller 9 to move the chain upwardly through the holder 5 and the movement effected by this raised portion of cam 15 is of a length corresponding to the length of the link formed by the second set of forming-tools. The operation is then repeated in the manner above set forth. The operation therefore involves three successive operations of one set of forming-tools and thereafter one operation of the other set of forming-tools so that the different forms of links occur in the chain at regular intervals. During the operation of the machine the support 5 for the chain is turned on its axis as is required to present the end link of the chain to the sets of forming-tools properly. In making chain of the character above described the holder 5 turns once through 90 degrees and then back to the initial position while the machine is making four links, that is, it is turned through 90 degrees and held in that position while a link is made, and then turned back and held in that position while three links are being formed successively by the two sets of forming-tools.

I have also shown means whereby the ends of the links of the chain may be joined together. For this purpose wire is employed in making the chain which is provided with a core of soldering material. When such wire is employed and it is desired to weld together the ends of the links, a tank 75 is provided through which the chain is carried and which contains a suitable fluid for washing from the chain any impurities which may be thereon. The chain is carried through the liquid in this tank by means of a wheel 76, mounted for rotation upon the walls of the tank and depending into the liquid. After passing through the tank 75 the chain passes over a wheel 77 mounted for rotation on suitable supports, and then passes around a wheel 78 mounted for rotation upon the walls of a tank 79 which contains a flux for the solder. After dipping into the flux in tank 79 the chain passes over an idler 80 and then through a suitable heater 81. The temperature within this heater is maintained just high enough to melt the core of the wire at the ends of the links and thus join together those ends. In the present instance I have shown an electric heater 81 consisting of a coil of wire connected in circuit within a suitable regulator 82.

I have described above one form of machine embodying my invention, but I wish it understood that the invention is in no way limited as to the details of the structure in which it is employed. For instance, in the machine illustrated, many of the parts are actuated by cams on the power-shaft, but if desired other means for actuating these parts may be employed. Instead of cams for reciprocating the forming-tools, I may employ cranks on one or more power-shafts and rockers actuated thereby in substantially the same manner as that illustrated in my Patent No. 948,615, dated February 8th, 1910. Also, the invention is not limited to use thereof in a machine for making a special form of chain.

The machine shown in Figs. 1 to 12 is, as above described, adapted for making chain consisting of three similar links and then one link of a different shape, but the principles of my invention may be utilized in a machine for making chain in which all of the links are similar or chain in which the several shapes of links differ in number and spacing from the chain made on the machine illustrated. Thus, in employing the machine shown in the drawings for making chain in which all of the links are similar, only one of the two sets of forming-tools need be employed, the other set being uncoupled in any convenient manner. The tools of the retained set would be operated at regular intervals by cams having raised portions of equal height and equally spaced. After each operation of the tools, the feeder would be operated a definite distance and the holder would be turned through ninety degrees. Such a modification of the machine shown in Figs. 1 to 12 is indicated in Figs. 13 and 14 wherein it will be seen that but one set of tools is employed. These tools are indicated at 100 and 101, and they are operated in the manner heretofore described by cams 41' and 33'. These two cams have four raised portions of equal height and equally spaced as shown. After each operation of the tools, the feeder 9 is operated one step and all the steps of the feeder are of the same length. The feeder 9 is actuated as heretofore described by a cam 15' having four raised portions of equal height and equally spaced. After each operation of the tools, the holder 5 is turned through ninety degrees, first one way and then the other, and this movement of holder 5 is effected by a cam 25' having two diametrically opposite raised portions of equal height. In the operation of this machine, the tools will be reciprocated at regular intervals by cams 41' and 33' to make links all of the same size and shape and mesh each link with the end link of the chain projecting from the end of the holder 5. After each operation of the tools, the feeder will be operated by cam 15' to draw the chain upwardly so that the newly formed link projects from the end of the holder and the holder will be turned ninety degrees by cam 25' so that the end link of the chain will be in position to receive the next link.

If desired, both sets of tools may be employed in a machine for making links all of which are alike, the two sets of tools having operating faces which are alike in size and shape. Such a machine is indicated in Figs. 15 and 16 which show two sets of tools arranged as shown in Figs. 1 to 12. The two sets of tools are operated alternately by cams each of which has two diametrically opposite raised portions of equal height. The tools of one set are operated by cams 41" and 33" which have but two raised portions and the tools of the other set are operated by cams 65" and 68" which also have two raised portions. After each operation of the tools, the feeder 9 is operated to feed the chain along in steps of equal length, the feeder being operated by a cam 15" which has four raised portions of equal height and equally spaced. In this case, there is no occasion to turn the holder 5 on its axis and therefore the holder is mounted stationarily and an operating mechanism therefore is not shown. With the machine shown in Figs. 15 and 16, the two sets of tools will be operated alternately at regular intervals and the feeder will be actuated after each operation of a set of tools so that chain will be made in which all the links are alike.

Having now described my invention, what I claim as new therein and desire to secure by Letters Patent is as follows:—

1. The combination of a holder for a length of chain having an opening therethrough through which the chain passes, a pair of reciprocatory forming-tools mounted on opposite sides of the holder, a feeder for the chain passing through the holder, a power-shaft and connections from the power-shaft to said tools for operating the tools at definite intervals and for operating the feeder in the intervals between successive operations of said tools, said tools when moved by the power-shaft acting to form links and mesh said links with those of the chain in the holder, substantially as set forth.

2. The combination of a holder for a length of chain having an opening therethrough of cruciform cross-section and slotted at one end through said opening, a pair of reciprocatory forming-tools mounted on opposite sides of the holder adjacent to said slotted end, a feeder for the chain passing through the holder, a power-shaft and connections from the power shaft to said tools for operating the tools at definite intervals and for operating said feeder after each operation of the tools to move the chain a distance sufficient to carry the newly-formed link partially into the opening in the holder, said tools when moved by the power shaft acting to form links and mesh said links with those of the chain in the holder, substantially as set forth.

3. The combination of a holder for a length of chain having an opening therethrough through which the chain passes, a pair of reciprocatory forming-tools mounted on opposite sides of the holder, a feeder for the chain passing through the holder, a power-shaft, connections from the power-shaft to said tools for operating the tools at definite intervals and for operating the feeder after each operation of the tools, and connections from the power-shaft to said holder for turning the holder in the intervals between successive reciprocations of said tools, said tools when moved by the power-shaft acting to form links and mesh said links with those of the chain in the holder, substantially as set forth.

4. The combination of a holder for a length of chain having an opening therethrough through which the chain passes, two pairs of forming-tools mounted adjacent to one end of said holder, the tools of each pair being on oposite sides of the holder and the pairs being displaced angularly about the axis of the holder, means for reciprocating said tools to automatically form links meshed with those of the chain in the holder, and means for automatically feeding the chain through the holder, substantially as set forth.

5. The combination of a holder for a length of chain having an opening therethrough of cruciform cross-section through which the chain passes, means for automatically feeding the chain through said opening step by step, two pairs of forming-tools mounted adjacent to one end of the holder, the tools of each pair being on opposite sides of the holder and the two pairs being displaced angularly about the axis of the holder, and means for reciprocating the tools of said pairs, those of one pair after those of the other in a prescribed order, each pair of tools being arranged to form links meshed with those of the chain in said holder, substantially as set forth.

6. The combination of a holder for a length of chain having an opening therethrough through which the chain passes, means for automatically feeding the chain through said holder, means for reciprocating the holder about its axis, two sets of forming-tools mounted adjacent to one end of the holder, the tools of each set being on opposite sides of the holder and the two sets being displaced angularly about the axis of the holder, and means for reciprocating the tools of said sets, those of one set after those of the other in a prescribed order, each set of tools being arranged to form links meshed with those of the chain in said holder, substantially as set forth.

7. The combination of a holder for a length of chain having an opening therethrough of cruciform cross-section and slotted at one end through said opening, means for feeding a length of chain step by step through said opening, means for reciprocating the holder about its axis, two sets of forming-tools mounted adjacent to the slotted end of said holder, the tools of each set being on opposite sides of the holder and the two sets being displaced angularly about the axis of the holder, and means for automatically actuating the tools of said sets, those of one set after those of the other in a prescribed order, each set of tools being arranged to form links meshed with those of the chain passing through the holder, substantially as set forth.

8. The combination of a holder for a length of chain having an opening therethrough through which the chain passes, two sets of forming-tools mounted adjacent to one end of the holder, the operating faces of the tools of one set having different dimensions from those of the other set, means for automatically actuating said tools to form links and mesh them with those of the chain passing through said opening, and means for automatically feeding the chain through said opening after each operation of said tools, the links made by said sets of tools being of different dimensions and the feeding movement following the operation of one set of tools being greater than that following the operation of the other set, substantially as set forth.

9. The combination of a holder for a length of chain having an opening therethrough of cruciform cross-section, two sets of forming-tools mounted adjacent to one end of the holder and arranged one at substantially a right angle to the other, the operating faces of the tools of one set having different dimensions from those of the other set, means for automatically actuating said tools to form links and mesh them with those of the chain passing through said opening, means for automatically reciprocating said holder and the chain passing therethrough about their axis, and means for automatically feeding the chain through said opening after each operation of said tools, the links made by said sets of tools being of different dimensions and the feeding movement following the operation of one set of tools being greater than that following the operation of the other set, substantially as set forth.

10. The combination of a holder for a length of chain having an opening therethrough through which the chain passes, two sets of forming-tools mounted adjacent to one end of the holder, means for automatically operating said sets of tools successively in a prescribed order to form links and mesh them with those of the chain in said opening, means for turning said holder and the chain therein about their axis between successive operations of the same set of forming-tools, and means for feeding the chain through the holder, substantially as set forth.

11. The combination of a holder having an opening therethrough through which a length of chain extends, a link-making device mounted adjacent to one end of the holder, a feeder for the chain passing through the holder, a power-shaft, connections from the power-shaft to said link-making device for actuating the latter intermittently to make links and mesh them each with the end link of the chain in the holder, means actuated by the power-shaft for moving said feeder a definite amount after each operation of the link-making device and means actuated by the power-shaft for intermittently turning said holder and with it the chain passing therethrough in the intervals between successive operations of the link-making device, substantially as set forth.

12. The combination of a holder having an opening therethrough through which a length of chain extends with its end projecting beyond the end of said opening, two link-making devices mounted adjacent to one end of the holder, a feeder for the chain passing through the holder, a power-shaft, connections from the power-shaft to said link-making devices for operating said devices in a prescribed order to make links and mesh them each with the end link of the chain in the holder and means actuated by the power-shaft for operating said feeder after each operation of the link-making devices to move the chain through said opening in the holder until the newly-formed link projects from the end of the opening.

13. The combination of a holder having an opening therethrough through which a chain extends with its link projecting beyond the end of said opening, a link-forming device mounted adjacent to one end of the holder, a feeder for the chain passing through the holder, a power-shaft, means actuated by the power-shaft for operating said feeder after each operation of the link-forming device to move the chain through said opening in the holder until the newly-formed link projects from the end of the opening, and connections from the power-shaft to said link-forming device for operating the latter to form a staple, mesh the staple with the end link of the chain in said holder and then form the staple into a link, substantially as set forth.

14. The combination of a holder having an opening therethrough of cruciform cross-section, means for feeding the chain through said opening so that the end link of the chain projects beyond the holder, two link-forming devices mounted adjacent to one end of the holder, means for automatically operating said devices successively in a prescribed order so that each forms a staple, links the staple with the end link of the chain and then forms the staple into a link, and means for turning the holder and the chain therein about their axis between successive operations of the same link-forming device, substantially as set forth.

15. The combination of a holder for a length of chain having an opening therethrough through which the chain passes, a pair of reciprocatory forming-tools mounted on opposite sides of the holder, a feeder for the chain passing through the holder, a power-shaft, connections from the power-shaft to said tools for operating the tools at definite intervals and for operating the feeder in the intervals between successive operations of said tools, said tools at each operation thereof by the power-shaft acting to form a staple, link the staple with the end link of the chain and then form the staple into a link, substantially as set forth.

16. The combination of a holder for a length of chain having an opening therethrough through which the chain passes, a pair of reciprocatory forming-tools mounted on opposite sides of the holder, a feeder for the chain passing through the holder, a power-shaft, connections from the power-shaft to the said tools for operating the tools at definite intervals and for operating the feeder after each operation of the tools and connections from the power-shaft to said holder for turning the holder in the intervals between successive reciprocations of said tools, said tools when reciprocated by the power-shaft acting to form a staple, link the staple with the end link of the chain in the holder and then form the staple into a link, substantially as set forth.

17. The combination of a holder for a length of chain having an opening therethrough through which the chain passes, two sets of forming-tools mounted adjacent to one end of the holder, the operating faces of the tools of one set having different dimensions from those of the other set, means for automatically actuating the tools of each set to form a staple, link the staple with the end link of the chain in the holder, and then form the staple into a link, and means for automatically feeding the chain through the holder after each operation of said sets of tools, the links made by said sets of tools being of different dimensions and the feeding movement following the operation of one set of tools being greater than that following the operation of the other set, substantially as set forth.

18. The combination of a holder for a length of chain having an opening therethrough through which the chain passes, a link-forming tool reciprocating toward and away from one end of the holder, a die-member coöperating therewith, an anvil in the path of movement of the tool, means for feeding wire between the anvil and the end of the tool, means for moving the anvil out of the path of movement of the tool as the latter moves toward the anvil, a feeder for the chain passing through the holder, a power-shaft, and connections from the power-shaft to said tool and said feeder for operating the tool at definite intervals and for operating the feeder in the intervals between successive operations of the tool, substantially as set forth.

19. The combination of a holder for a length of chain having an opening therethrough through which the chain passes, a link-forming tool reciprocating toward and away from one end of the holder, an anvil in the path of movement of the tool, means for feeding wire between the anvil and the end of the tool, means for moving the anvil out of the path of movement of the tool as the latter moves toward the anvil, a die-member opposite the end of said tool and on the other side of the axis of the holder, a feeder for the chain passing through the holder, a power-shaft, connections from the power-shaft to said tool for operating the same at definite intervals, connections from the power-shaft to the feeder for operating the latter in the intervals between successive operations of the tool, and means actuated by the power-shaft for turning the holder on its axis, substantially as set forth.

20. The combination of a holder for a length of chain having an opening therethrough through which the chain passes, a plunger reciprocating toward and away from one end of the holder, a link-forming tool movable in an opening in the plunger, means for moving the plunger and tool simultaneously and the tool independently of the plunger, an anvil in the path of movement of the tool, means for feeding wire between the anvil and the ends of the tool and plunger, means for moving the anvil out of the path of movement of the tool as the latter moves toward the anvil, a feeder for the chain passing through the holder, and connections from the power-shaft to said tool and said feeder for operating the tool at definite intervals and for operating the feeder in the intervals between successive operations of the tool, substantially as set forth.

21. The combination of a holder for a length of chain having an opening therethrough through which the chain passes, a plunger movable toward and away from one end of the holder, a tool movable in an opening in the plunger, a sleeve on the end of the tool, means for moving the tool and plunger simultaneously and the tool independently of the plunger, an anvil in the path of movement of the tool, means for feeding wire between the anvil and the ends of the tool and plunger, means for moving the anvil out of the path of movement of the tool as the latter moves toward the anvil, a die-member opposite the ends of said tool and plunger and on the other side of the axis of the holder, a feeder for the chain passing through the holder, a power-shaft, connections from the power-shaft to said tool for operating the same at definite intervals, connections from the power-shaft to the feeder for operating the latter in the intervals between successive operations of the tool, and means actuated by the power-shaft for turning the holder on its axis, substantially as set forth.

This specification signed and witnessed this 2nd day of May, 1911.

ALPHONSO C. PRATT.

Witnesses:
  Arthur W. Ross,
  Edward Davis.